United States Patent
Grice et al.

(10) Patent No.: US 12,207,623 B2
(45) Date of Patent: Jan. 28, 2025

(54) CARRIER FOR PET TAG AND ELECTRONIC TRACKING DEVICE

(71) Applicant: THE HILLMAN GROUP, INC., Cincinnati, OH (US)

(72) Inventors: Byron K. Grice, Phoenix, AZ (US); Michael J. Schmidt, Gilbert, AZ (US)

(73) Assignee: THE HILLMAN GROUP, INC., Forest Park, OH (US)

( * ) Notice: Subject to any disclaimer, the term of this patent is extended or adjusted under 35 U.S.C. 154(b) by 323 days.

(21) Appl. No.: 17/939,607

(22) Filed: Sep. 7, 2022

(65) Prior Publication Data
US 2023/0092912 A1    Mar. 23, 2023

Related U.S. Application Data

(60) Provisional application No. 63/246,461, filed on Sep. 21, 2021.

(51) Int. Cl.
    *G09F 3/20*     (2006.01)
    *A01K 11/00*     (2006.01)

(52) U.S. Cl.
    CPC ............ *A01K 11/006* (2013.01); *G09F 3/201* (2013.01)

(58) Field of Classification Search
    CPC .............................. A01K 11/006; G09F 3/201
    See application file for complete search history.

(56) References Cited

U.S. PATENT DOCUMENTS

| | | |
|---|---|---|
| D172,023 S | 4/1954 | Henry |
| D208,720 S | 9/1967 | Burkhardt |
| D213,907 S | 4/1969 | Woofter |
| D225,586 S | 12/1972 | Stahl |
| D251,274 S | 3/1979 | Colan |
| 4,259,798 A | 4/1981 | McConnell |
| D259,445 S | 6/1981 | Clarke |
| D263,764 S | 4/1982 | Bride |
| D274,151 S | 6/1984 | Child |
| D349,189 S | 8/1994 | Hong |
| D358,251 S | 5/1995 | Bettis |
| D359,756 S | 6/1995 | Ely |
| D363,315 S | 10/1995 | Ely |
| D379,253 S | 5/1997 | Knapp |
| 5,752,335 A | 5/1998 | Shimogori |
| D442,363 S | 5/2001 | Magid |

(Continued)

FOREIGN PATENT DOCUMENTS

| | | |
|---|---|---|
| CN | 210983462 U | 7/2020 |
| EP | 651942 A1 | 5/1995 |
| KR | 20180069166 A | 6/2018 |

*Primary Examiner* — Gary C Hoge
(74) *Attorney, Agent, or Firm* — THOMPSON HINE LLP

(57) ABSTRACT

A carrier assembly for a pet tag and an electronic tracking component includes a front cover, a retainer ring and a rear cover engaged with each other, with the retainer ring between the front cover and the rear cover. The retainer ring is movable, relative to the front cover and the rear cover, between a release position and a retention position, wherein, in the retention position of the retainer ring, the rear cover is retained adjacent the front cover and retainer ring for holding an electronic tracking device in the second recess, wherein, in the release position of the retainer ring, the rear cover is released to enable the rear cover to be separated from the front cover and retainer ring.

19 Claims, 17 Drawing Sheets

(56) References Cited

U.S. PATENT DOCUMENTS

| | | |
|---|---|---|
| D445,518 S | 7/2001 | Warden |
| D458,421 S | 6/2002 | Wasserman |
| D476,767 S | 7/2003 | Warden |
| D500,808 S | 1/2005 | Howard |
| D516,126 S | 2/2006 | Schantz |
| D528,783 S | 9/2006 | Mil |
| D534,455 S | 1/2007 | Tu |
| D560,862 S | 1/2008 | Knuth |
| D561,411 S | 2/2008 | Pipenur |
| D569,424 S | 5/2008 | Law |
| D603,456 S | 11/2009 | Brodsky |
| D609,457 S | 2/2010 | Blanford |
| 7,861,443 B2 | 1/2011 | Hill |
| D636,819 S | 4/2011 | Walker |
| D640,866 S | 7/2011 | Schmiemann |
| D660,370 S | 5/2012 | Podd |
| D666,807 S | 9/2012 | Telge |
| 8,543,134 B2 | 9/2013 | Lopez |
| D706,742 S | 6/2014 | Contello |
| D768,114 S | 10/2016 | Hou |
| D768,341 S | 10/2016 | Woertz |
| D780,436 S | 3/2017 | Fraser |
| D798,842 S | 10/2017 | Kass |
| D805,265 S | 12/2017 | Blizzard |
| 9,911,368 B2 | 3/2018 | Blizzard |
| D827,614 S | 9/2018 | Kass |
| D860,548 S | 9/2019 | Hicks |
| 10,463,021 B2 | 11/2019 | Lee |
| 10,575,496 B2 | 3/2020 | Lasher |
| D888,410 S | 6/2020 | Jacob |
| D892,493 S | 8/2020 | Carson |
| 10,785,957 B2 | 9/2020 | Weinrauch |
| 10,959,405 B2 | 3/2021 | Tryding |
| D922,760 S | 6/2021 | Jacob |
| 2003/0033737 A1 | 2/2003 | Bradshaw |
| 2006/0087440 A1* | 4/2006 | Klein ................ G09F 3/14 340/573.3 |
| 2007/0221140 A1 | 9/2007 | Warren |
| 2008/0062120 A1 | 3/2008 | Wheeler |
| 2014/0283424 A1* | 9/2014 | Cope ................ A01K 11/00 40/303 |
| 2015/0310774 A1* | 10/2015 | Igarashi ............ G09F 3/201 40/661 |
| 2017/0035026 A1* | 2/2017 | Bin ................ G09F 3/00 |
| 2017/0196202 A1* | 7/2017 | Ragonetti .......... A01K 15/021 |
| 2018/0160655 A1 | 6/2018 | Geier |
| 2020/0221666 A1* | 7/2020 | Tryding ............ A01K 11/004 |

\* cited by examiner

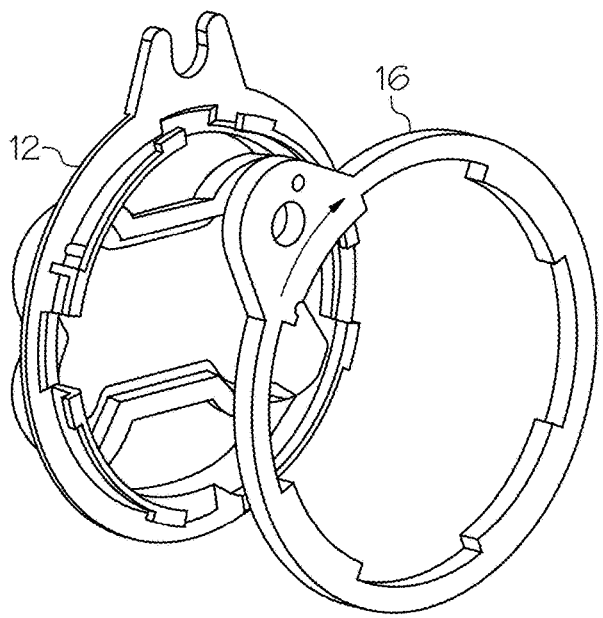 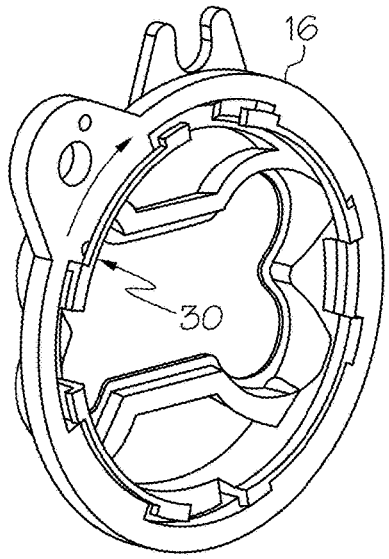
FIG. 5    FIG. 6
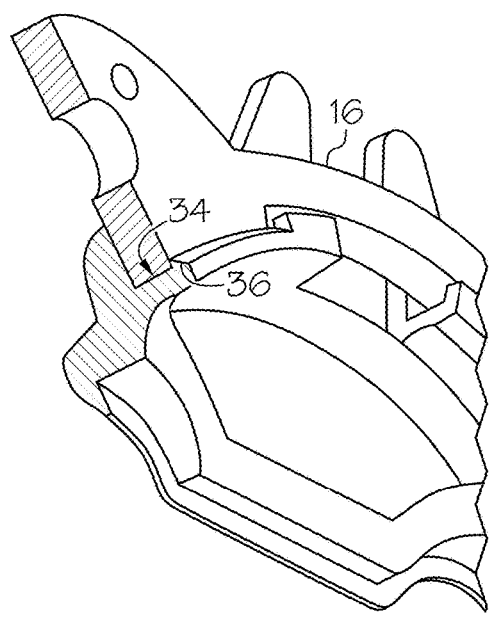 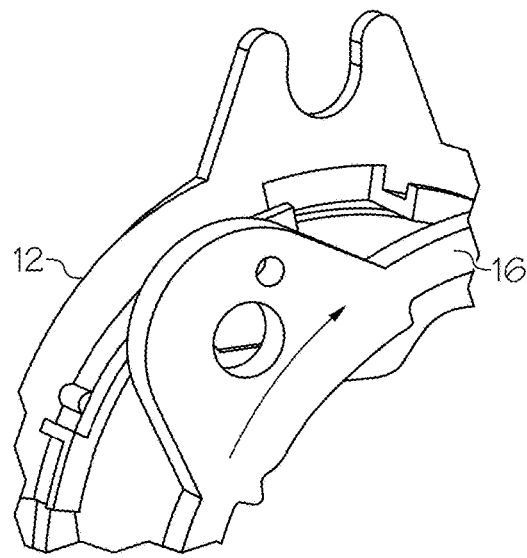
FIG. 8    FIG. 7

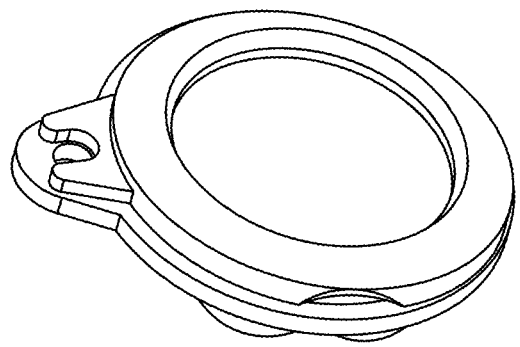
FIG. 20B
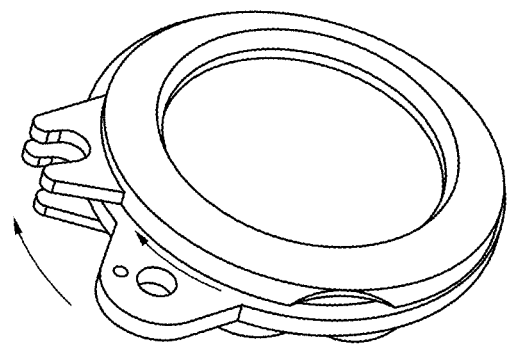
FIG. 20A
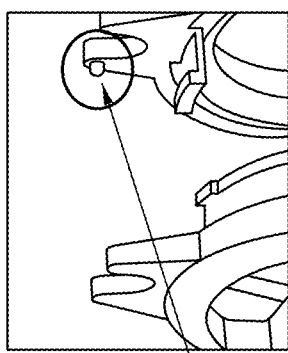
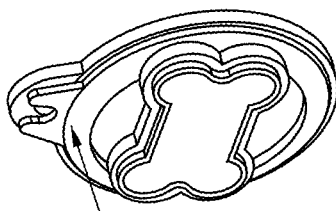
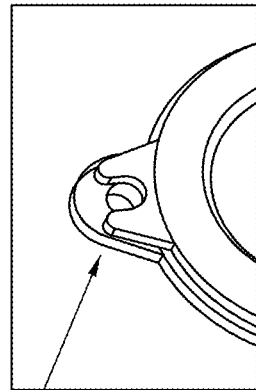
FIG. 19
The 3 features of the assembly in locked position:
1) Close until detent feature provides tactile feedback that the assembly is in the closed position.
2) Ring tabs and back cover gates are engaged.
3) The ring hole aligns with the surrounding jaws so that the collar split ring will also ensure that the assembly remians closed.

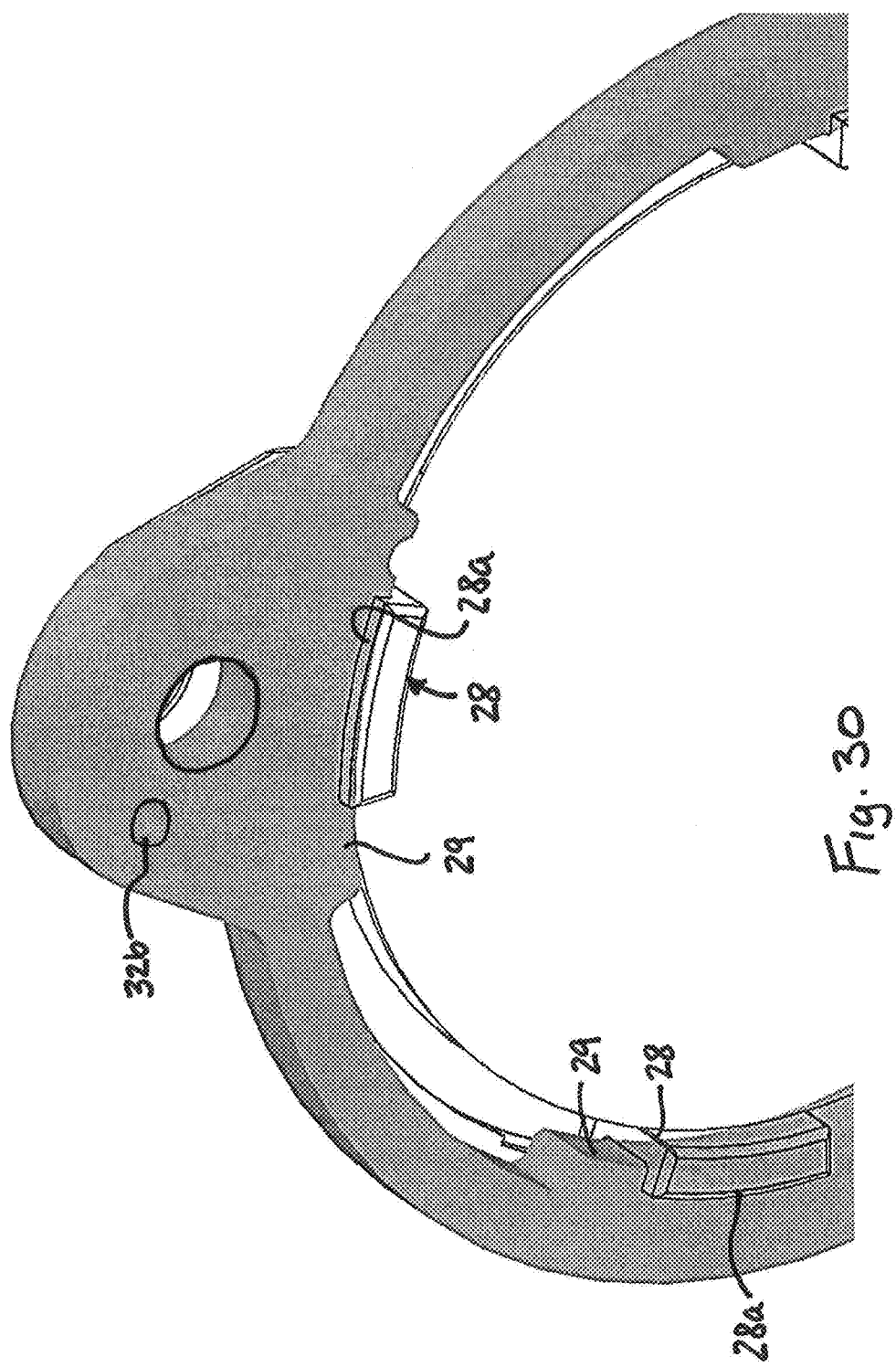

CARRIER FOR PET TAG AND ELECTRONIC TRACKING DEVICE

TECHNICAL FIELD

This application relates generally to carriers for pet tags and, more specifically, to a carrier adapted to carry both an engravable pet tag and an electronic tracking device.

BACKGROUND

The recent introduction of the Apple® AirTag® electronic tracking device provides the ability to track various items. The consuming public has begun to turn to such electronic tracking devices as a mechanism for keeping track of pets (e.g., cats and dogs).

It would be beneficial to provide a carrier capable of carrying both an engravable pet tag and an electronic tracking device.

SUMMARY

In one aspect, a carrier assembly for a pet tag and an electronic tracking component includes a front cover, a retainer ring and a rear cover engaged with each other, with the retainer ring between the front cover and the rear cover. The front cover defines a first recess for receiving a pet tag and a second recess for receiving an electronic tracking component. The retainer ring is rotatable between a release position and a retention position, wherein, in the retention position of the retainer ring, the rear cover is retained adjacent the front cover and retainer ring for holding an electronic tracking device in the recess, wherein, in the release position of the retainer ring, the rear cover is released to enable the rear cover to be separated from the front cover and retainer ring.

In another aspect, a carrier assembly for a pet tag and an electronic tracking component includes a front cover, a retainer ring and a rear cover engaged with each other, with the retainer ring between the front cover and the rear cover. A first recess internal space for receiving a pet tag and a second internal space for receiving an electronic tracking component are provided. The retainer ring is movable, relative to the front cover and the rear cover, between a release position and a retention position, wherein, in the retention position of the retainer ring, the rear cover is retained adjacent the front cover and retainer ring for holding an electronic tracking device in the second internal space, wherein, in the release position of the retainer ring, the rear cover is released to enable the rear cover to be separated from the front cover and retainer ring.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 5-8 show perspective views of assembly of the retainer ring onto the front cover;
FIG. 19 shows various features of the assembly;
FIGS. 20A-20B depict rotation of the retainer ring from the release position to the retention position;
FIG. 30 shows a partial perspective of the retainer ring interacting to hold the rear cover.

DETAILED DESCRIPTION

Figure 1:
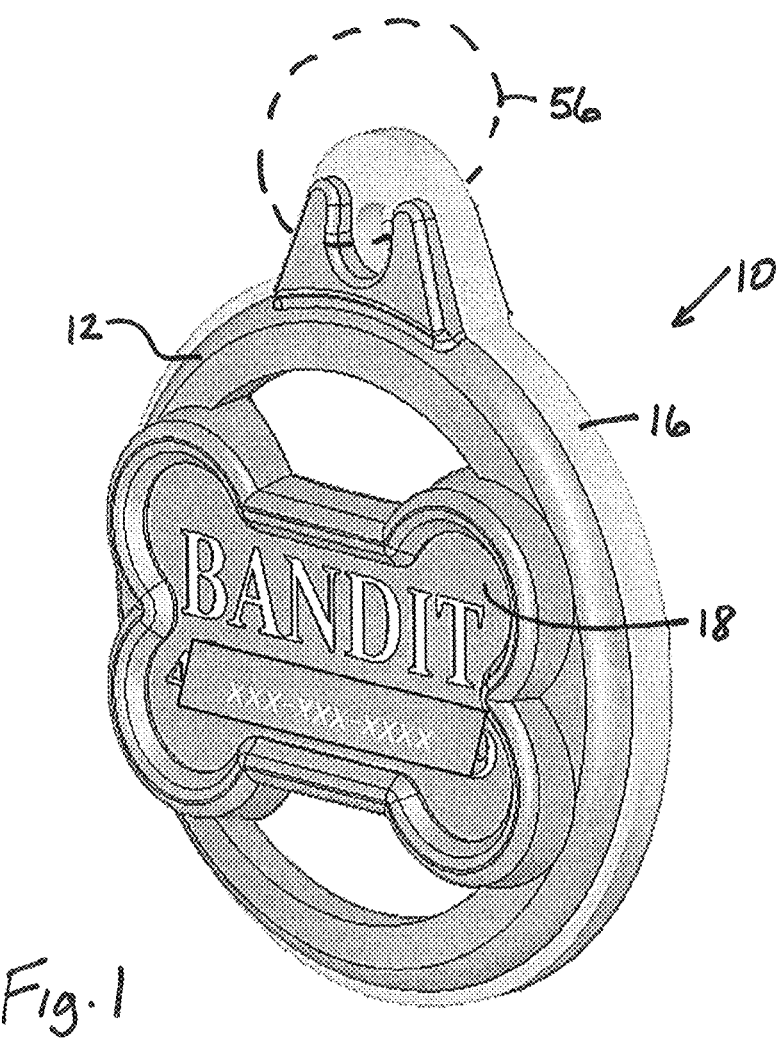
FIG. 1 is a perspective front view of a carrier assembly.
Figure 2:
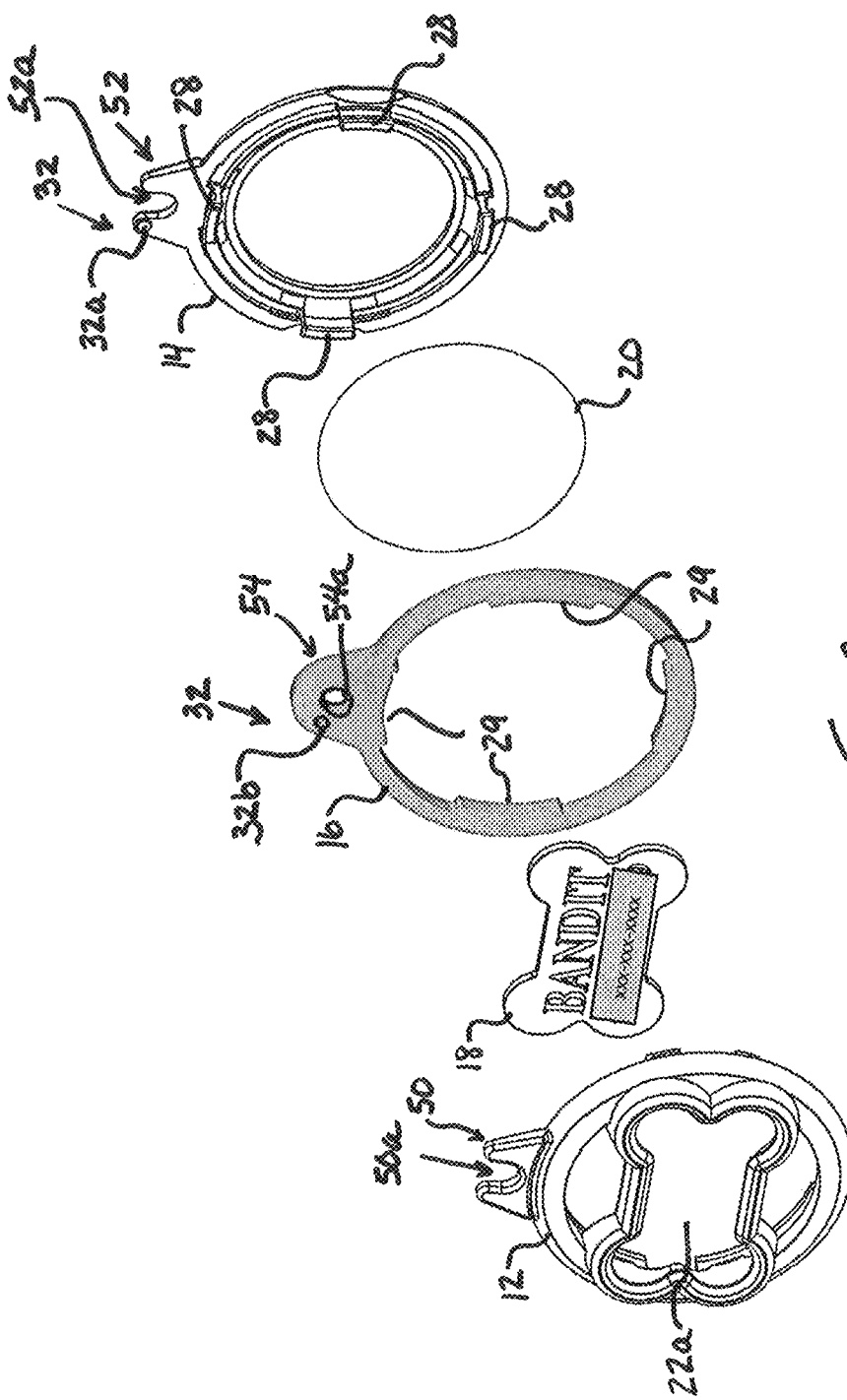
FIG. 2 is an exploded front perspective view of the assembly.

Referring to FIGS. 1-29, a carrier assembly 10 includes a front cover 12, a rear cover 14 and a retainer ring 16 therebetween. The carrier assembly 10 is adapted for carrying both an engraved/engravable pet tag 18 and an electronic tracking device or component 20 (shown here in the form of an AirTag®).

The front cover 12 defines a recess 22 for receiving the pet tag 18. The recess 22 defines a window 22a through which the pet tag can be viewed and includes retention barbs 22b or other features that interact with edge portions of the pet tag 18 to hold the pet tag 18 in the recess 22. Here, the recess and window shape is of dog bone configuration, but the configuration could vary widely to match whatever pet tag shape is used or desired (e.g., round, oval, rectangular etc.). The pet tag 18 is insertable by pushing into the recess 22 past the barbs 22b. The front cover also includes a recess 24 for receiving the electronic tracking component 20. Here, the recess 24 is a radially inward facing recess that receives an edge portion of the electronic tracking component 20 for seating of the component.

Notably, the retainer ring 16 is rotatable between a release position (e.g., FIGS. 9-13 and 20A) and a retention position (e.g., FIGS. 1 and 20B). In the retention position of the retainer ring 16, the rear cover 14 is retained adjacent the front cover 12 and retainer ring 16 for holding the electronic tracking component 20 in the recess 24. In the release position of the retainer ring 16, the rear cover 14 is released to enable the rear cover 14 to be separated from the front cover 12 and retainer ring 16, such as for the purpose of inserting or removing the component 20 and/or pet tag 18. Here, the front cover 12 includes a plurality of circumferentially spaced apart pockets 26 at its rear side, and the rear cover 14 includes a corresponding plurality of clips 28 that protrude forwardly and are inserted in the pockets 26. The retainer ring 16 includes a plurality of retaining rim parts 29, which extend radially inward. In the retention position of the retainer ring 16, the retaining rim parts 29 overlie, axially, retention portions 28a of the clips 28 to prevent the clips 28 from being pulled axially out of the pockets 26. In the release position of the retainer ring 16, the retaining rim} parts 29 are rotationally offset from the retention portions 28a of the clips 28 to allow the clips to be pulled out of the pockets 26, thus enabling separation of the rear cover 14.

A detent feature 30 is provided for releasably holding the retainer ring in the release position. Here, the detent feature 30 is formed by a projecting rib 30a on the front cover and a corresponding recess 30b into which the rib 30a seats when the retention ring is in the release position. A further detent feature 32 is provided for releasably holding the retainer ring 16 in the retention position. Here, the detent feature 32 is formed by a projection 32a (e.g., hemispherical) on a face of the rear cover 14 and an opening 32b on the retainer ring 16, such that the projections 32a can seat in the opening 32b.

Here, the front cover 12 includes a radially outward facing groove 34 in which the retainer ring is seated to inhibit separation of the retainer ring from the front cover. The groove 34 is bounded by a barb feature or features 36 for the purpose of this retention. The front cover 12 also includes tabs 38 that align with portions 29 of the retainer ring 16, when the retainer ring is in the retention position, for holding of the retainer ring adjacent the front cover when the retainer ring is in the retention position. In addition, the front cover includes circumferentially spaced apart stops 40 and 42 (e.g., here ribs) that limit rotation of the retainer ring 16 relative to the front cover 12 such that the retainer ring 16 can only rotate a set rotational amount to move between the retention position and the release position. The set rotational amount is less than ninety degrees, such as sixty degrees or less. The stop 40 interacts with rim edge 29a when the retainer ring is in the release position, preventing further rotation of the retainer ring away from the retention position. The stop 42 interacts with rim edge 29b when the retainer ring is in the release position, preventing further rotation of the retainer ring away from the release position.

The front cover 12 includes a forked projection 50 defining a slot 50a and the rear cover 14 includes a forked projection 52, aligned with the forked projection 50, and defining a slot 52a. The retainer ring 16 includes a projection 54 with an opening 54a for receiving a carrier ring (e.g., to be used for connection to a pet collar). When the retainer ring is in the retention position, the opening 54a aligns with the slots 50a and 50b, such that a carrier ring 56 (e.g., per FIG. 1) positioned in the opening 54a will interact with the forks of the projections 50, 52 to further inhibit rotation of the retainer ring toward the release position.

In use, the retainer ring 16 may be engaged onto the front cover 12 and shipped in this engaged manner, along with the separate rear cover 14 for customer use. The customer first inserts an engraved tag 18 from the rear side and into the recess 22, beyond the barbs 22b for retention in the recess 22. The customer next inserts the electronic tracking component 20 from the rear side until the component engages with the recess 24 to provide some retention of the component with the front cover 12 and retainer ring 16. Next, with the retainer ring 16 in the release position, the customer pushes the rear cover 14 into contact with the front cover 12 and retainer ring by aligning the forked projections 50 and 52 so that the clips 28 of the rear cover are aligned with and move into the pockets 26 of the front cover. The customer then rotates the retainer ring from the release position to the retention position, locking the assembly together, such that the rear cover cannot be pulled away. A carrier ring can then be attached through the opening 54a for use in attaching the assembly to a pet collar.

Figure 3:
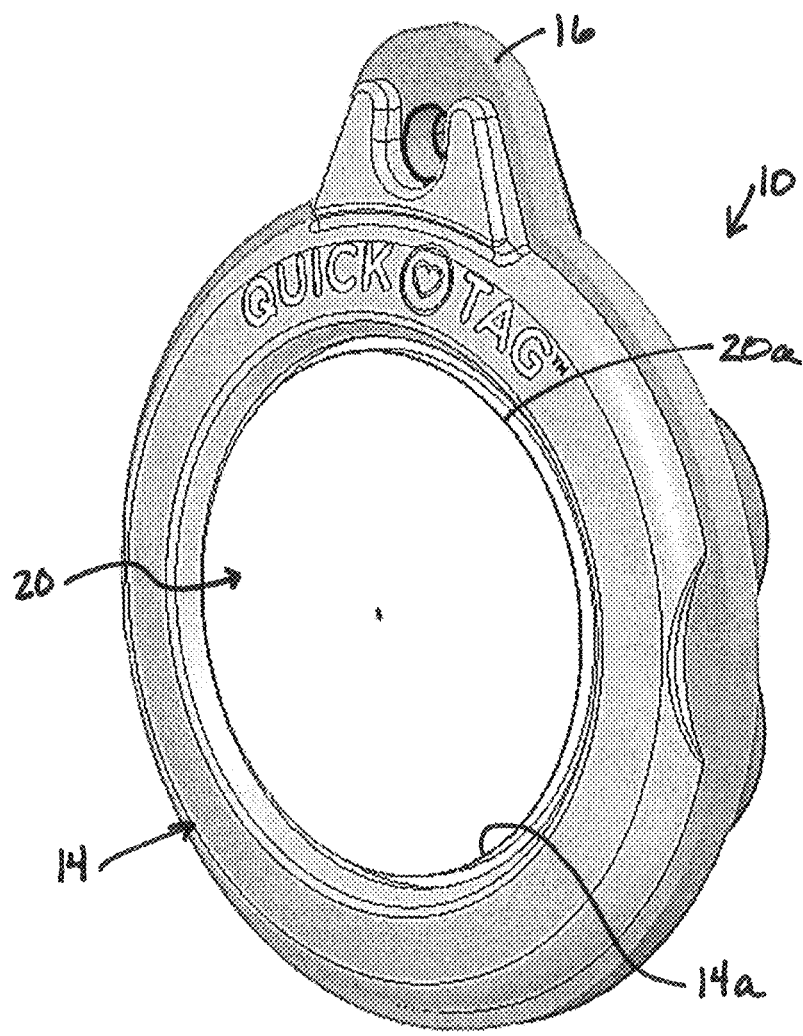
FIG. 3 is a perspective rear view of the assembly.
Figure 4:
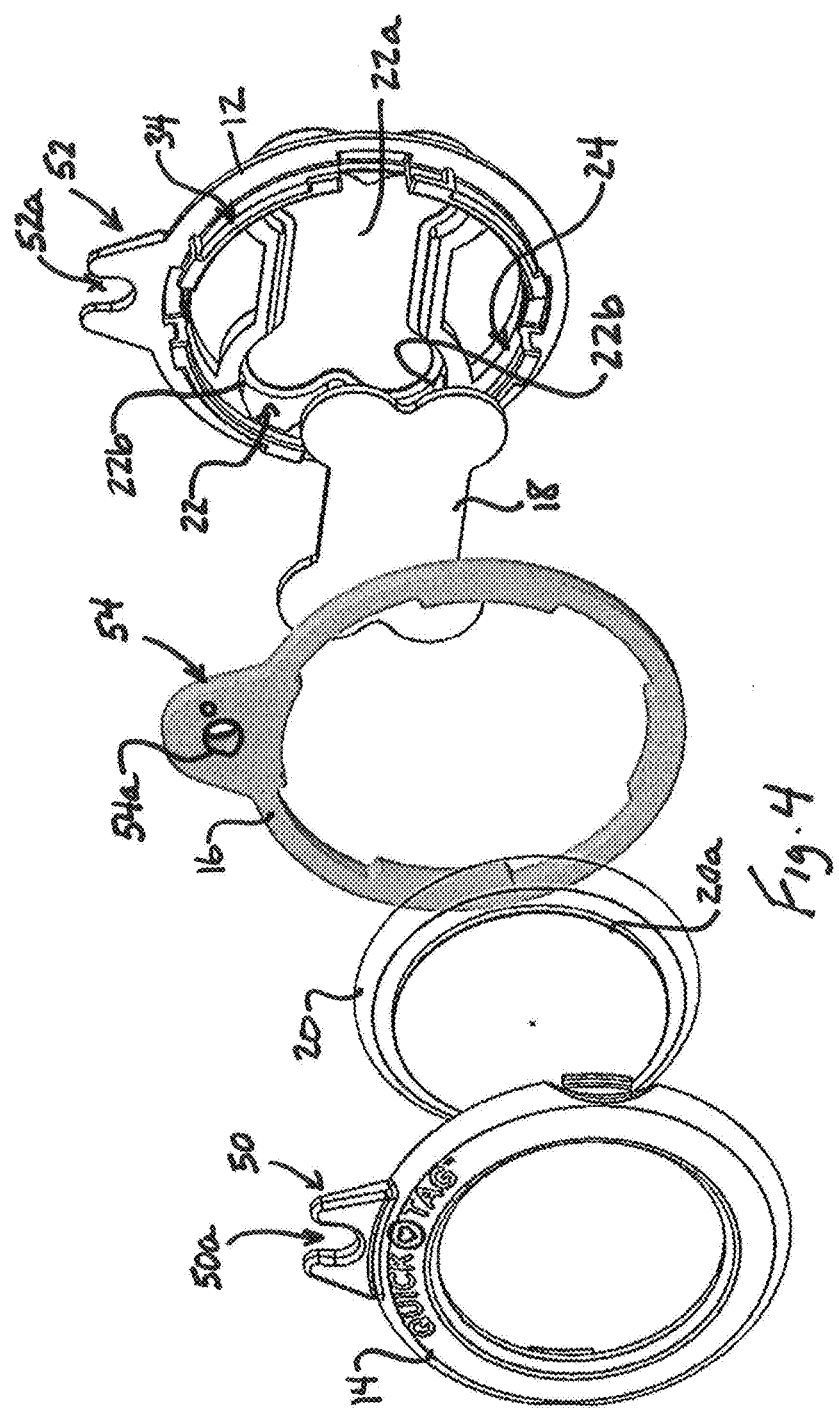
FIG. 4 is an exploded rear perspective view of the assembly.
Figure 9:
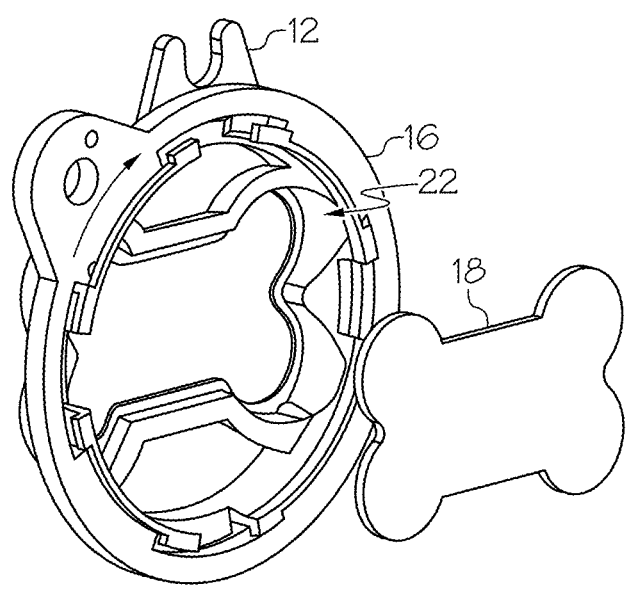
FIGS. 9-11 depict insertion of a pet tag into the engaged front cover and retainer ring.
Figure 10:
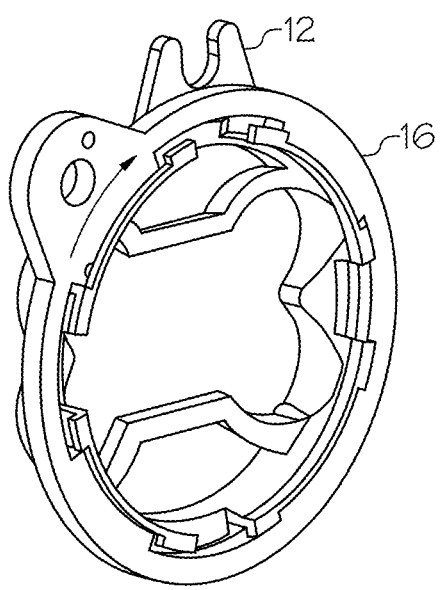
Figure 11:
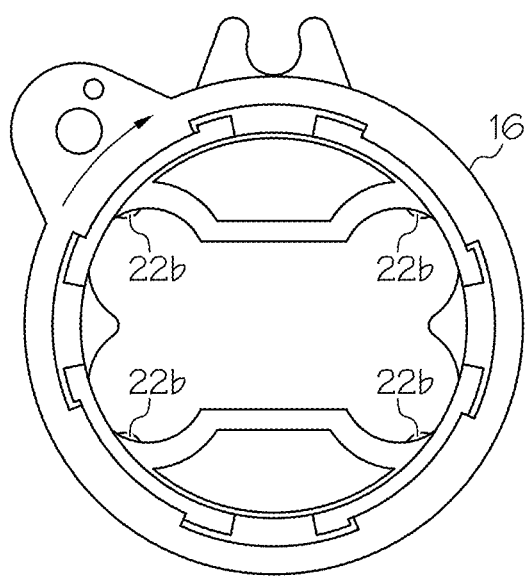
Figure 12:
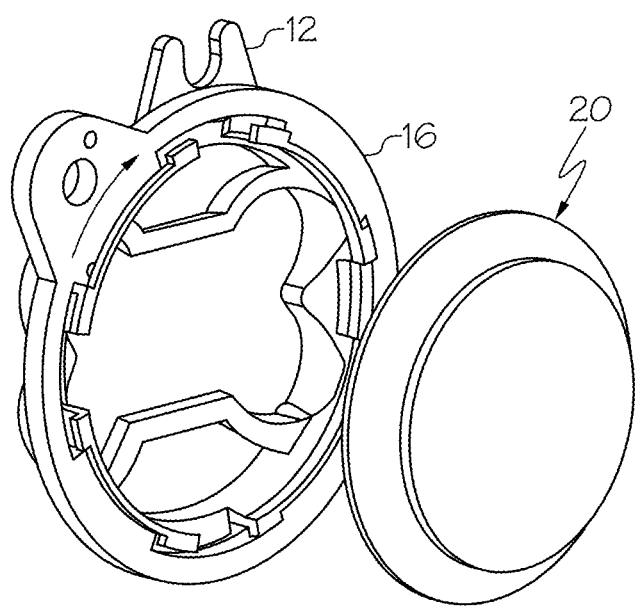
FIGS. 12-15 depict engagement of an electronic tracking component with the front cover and retainer ring.
Figure 13:
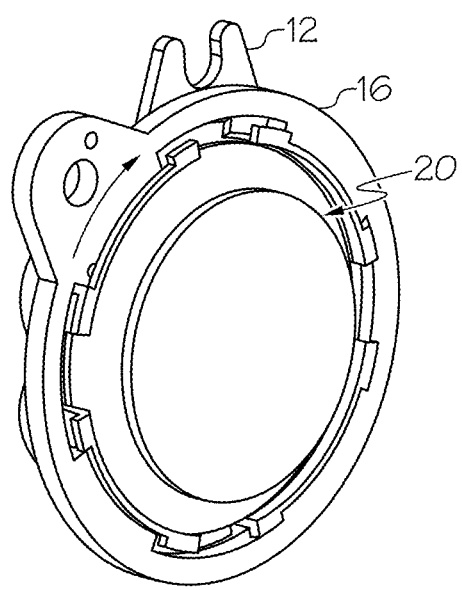
Figure 14:
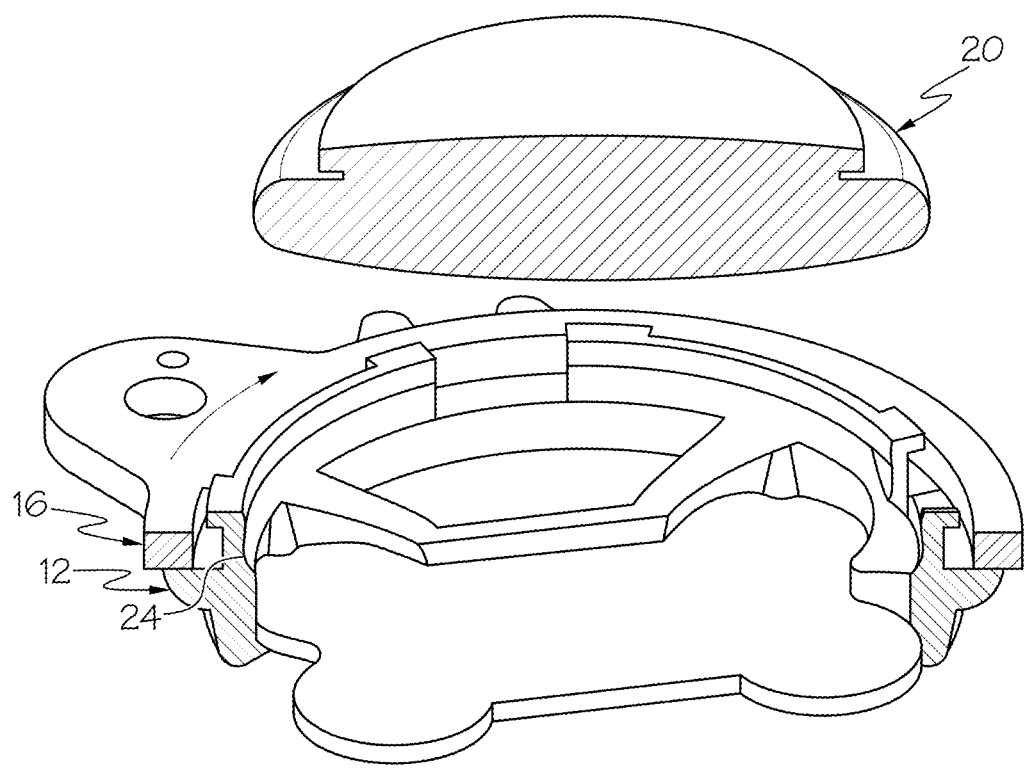
Figure 15:
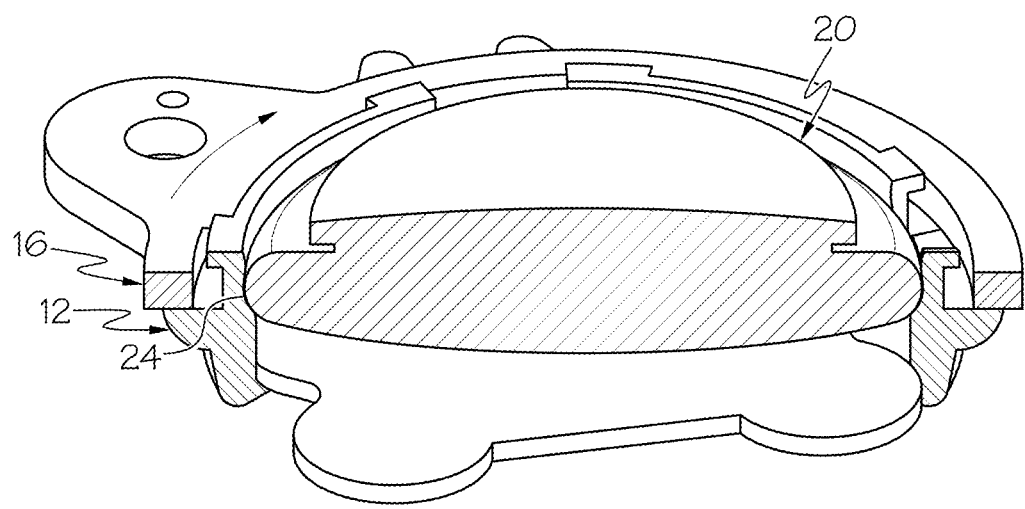
Figure 16:
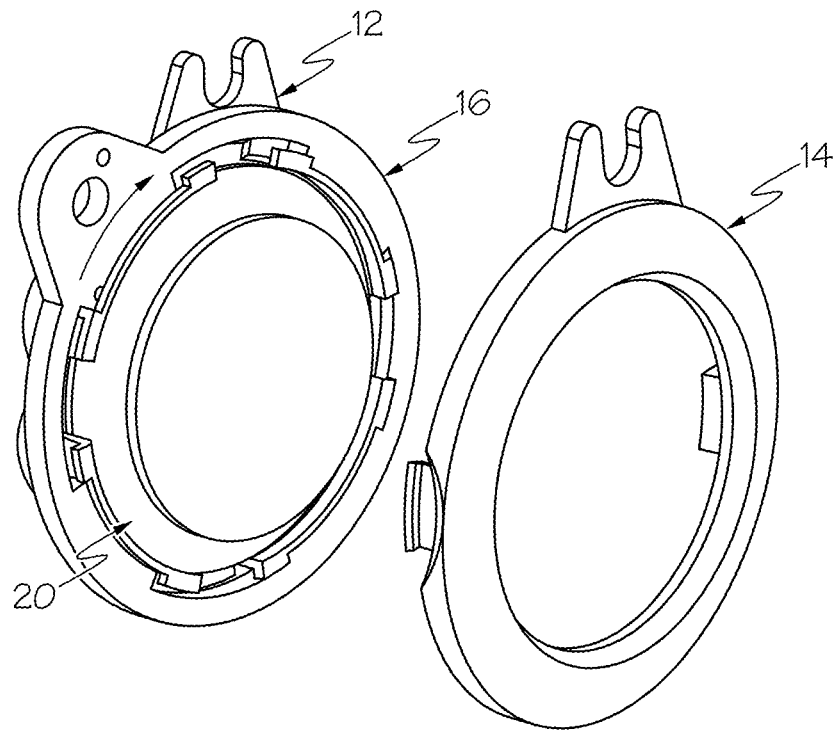
FIGS. 16-18 show engagement of the rear cover to the front cover and retainer ring.
Figure 17:
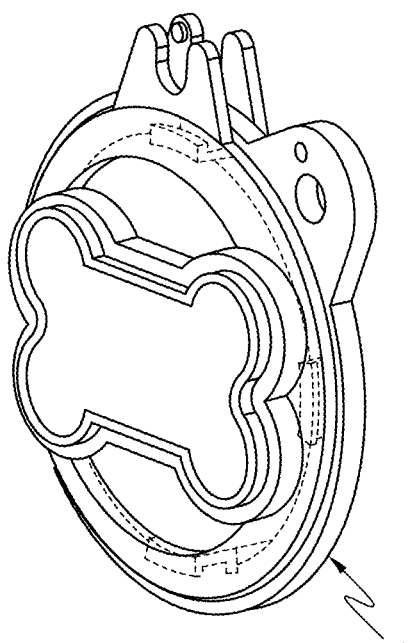
Figure 18:
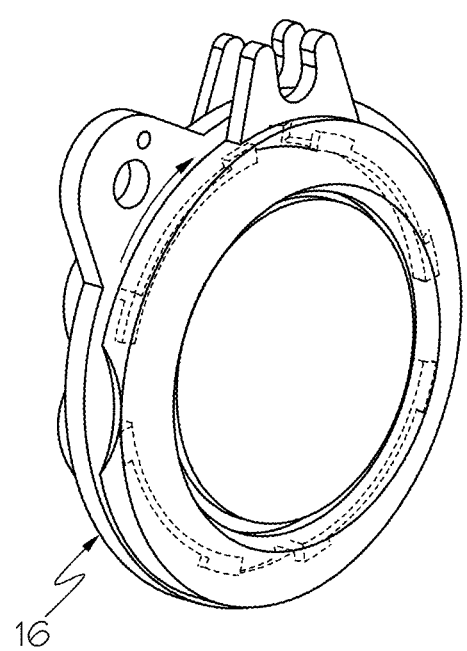
Figure 21:
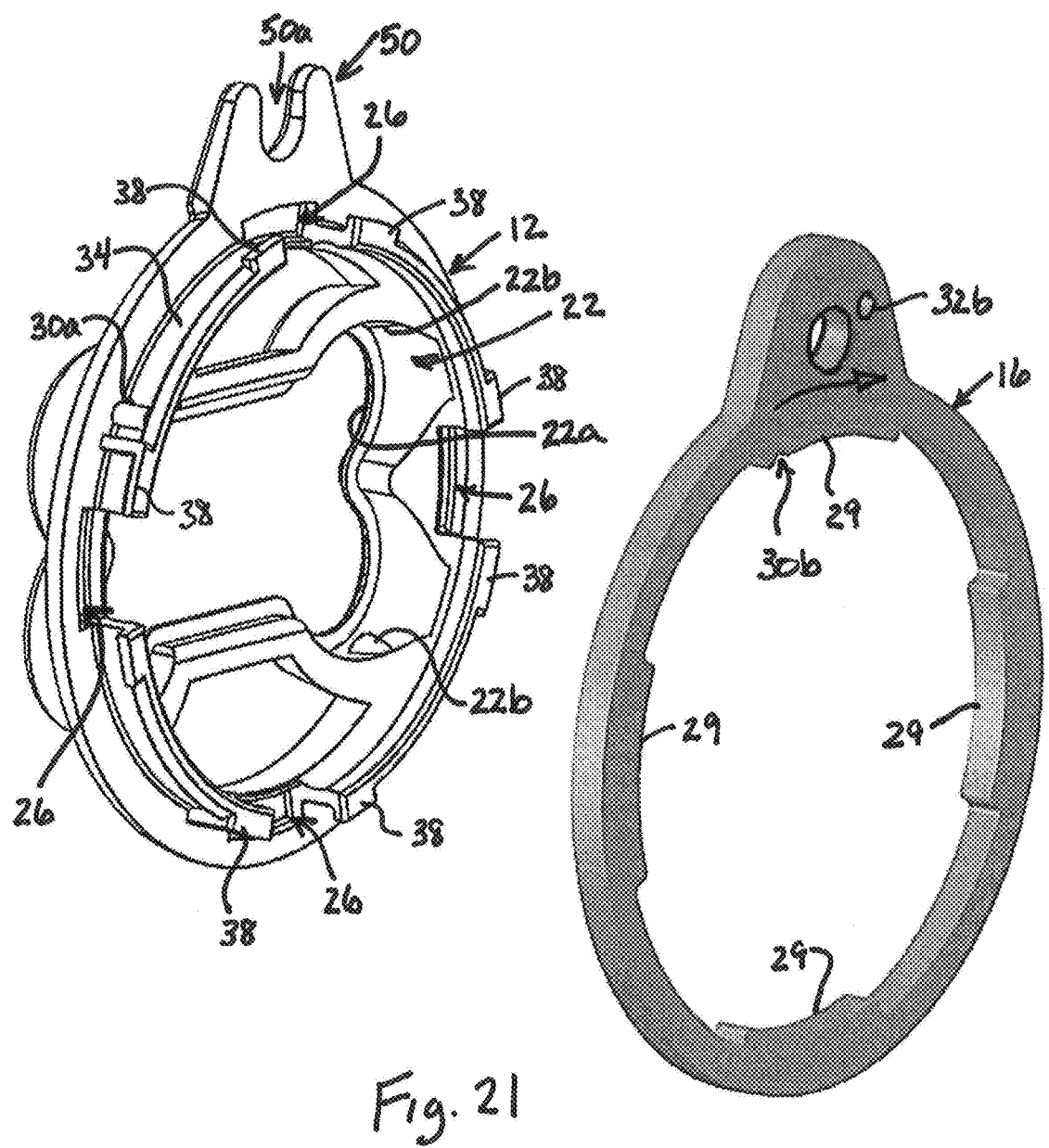
FIG. 21 shows a perspective of the front cover and retainer ring.
Figure 22:
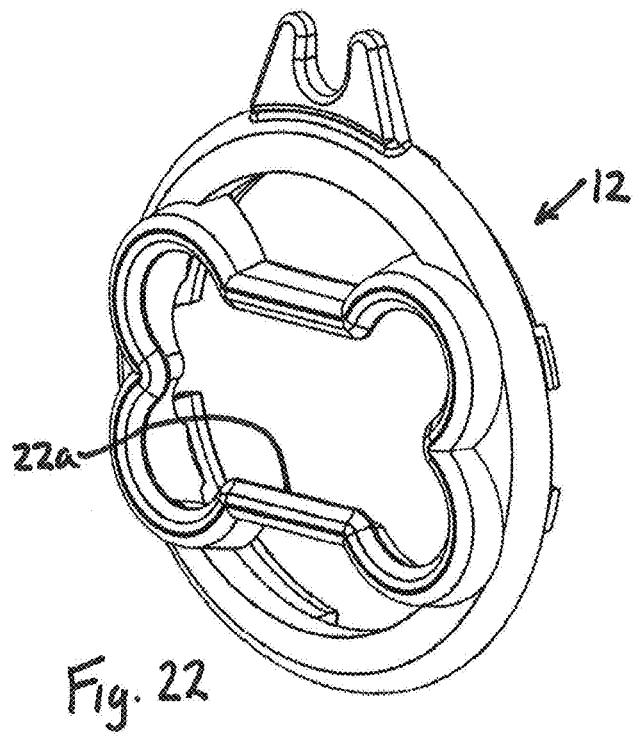
FIGS. 22-23 show front and rear perspectives of the front cover in isolation.
Figure 23:
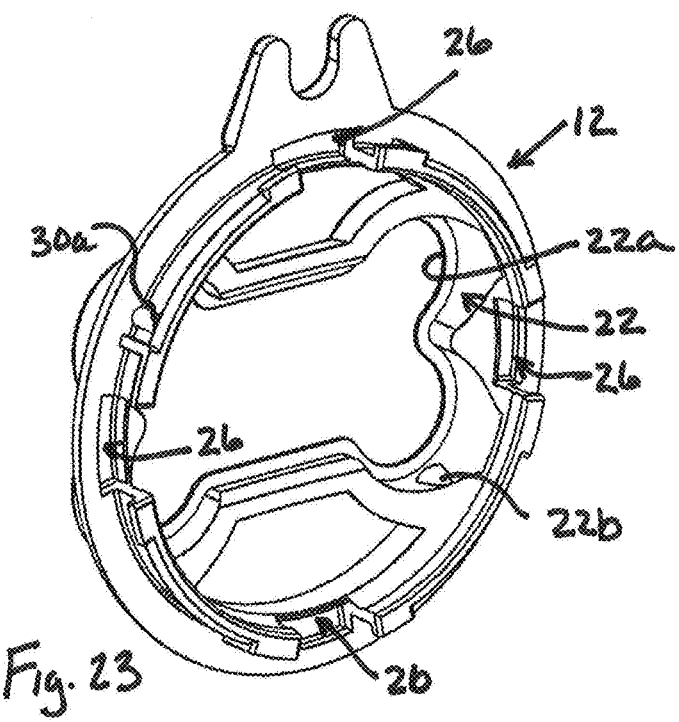
Figure 24:
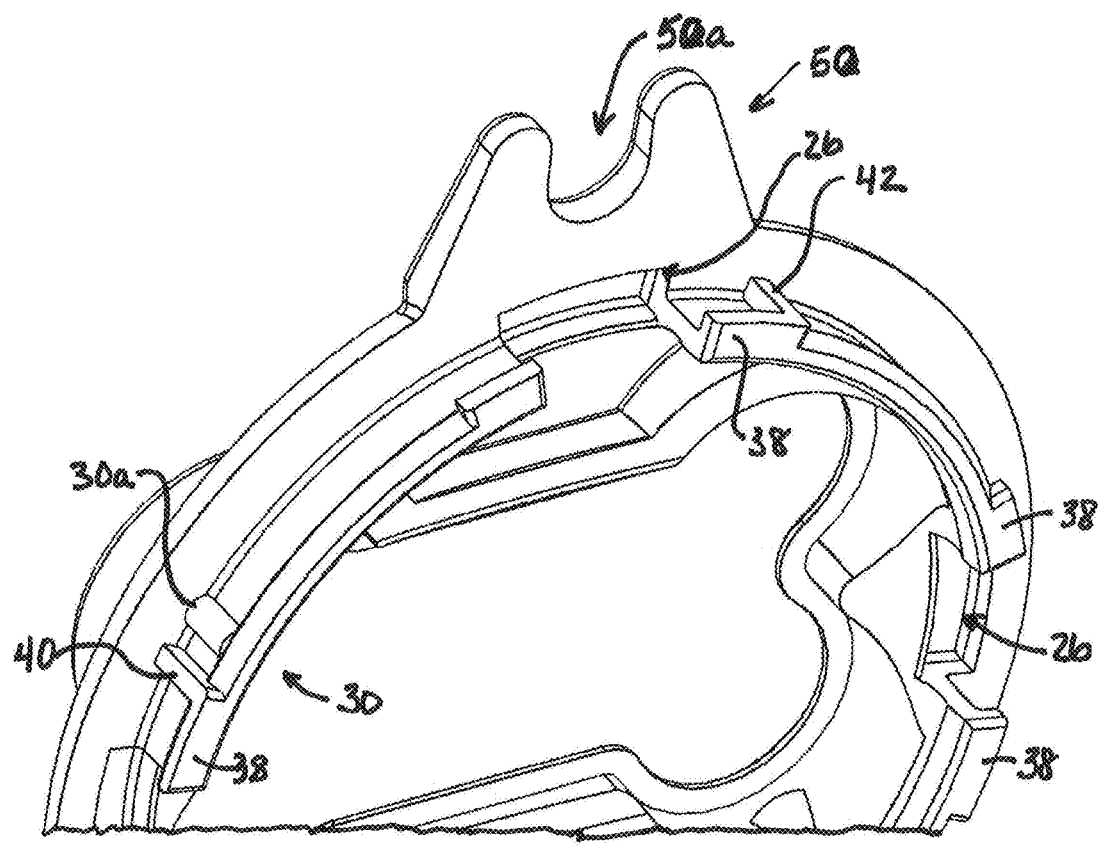
FIG. 24 shows a partial perspective of the rear side of the front cover.
Figure 25:
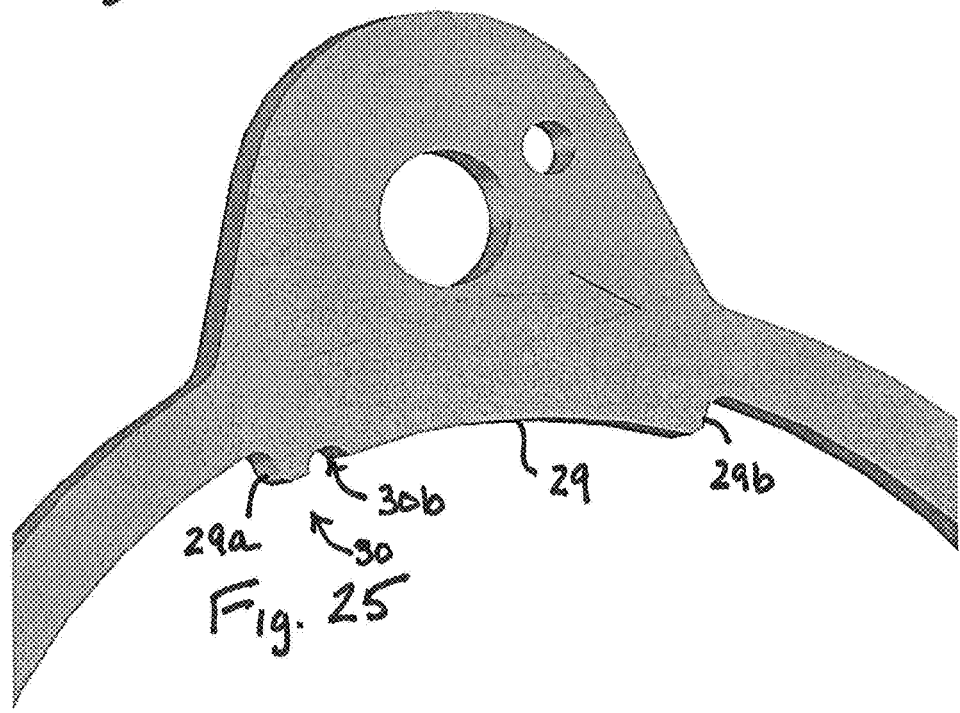
FIG. 25 shows a partial perspective of the retainer ring.
Figure 26:
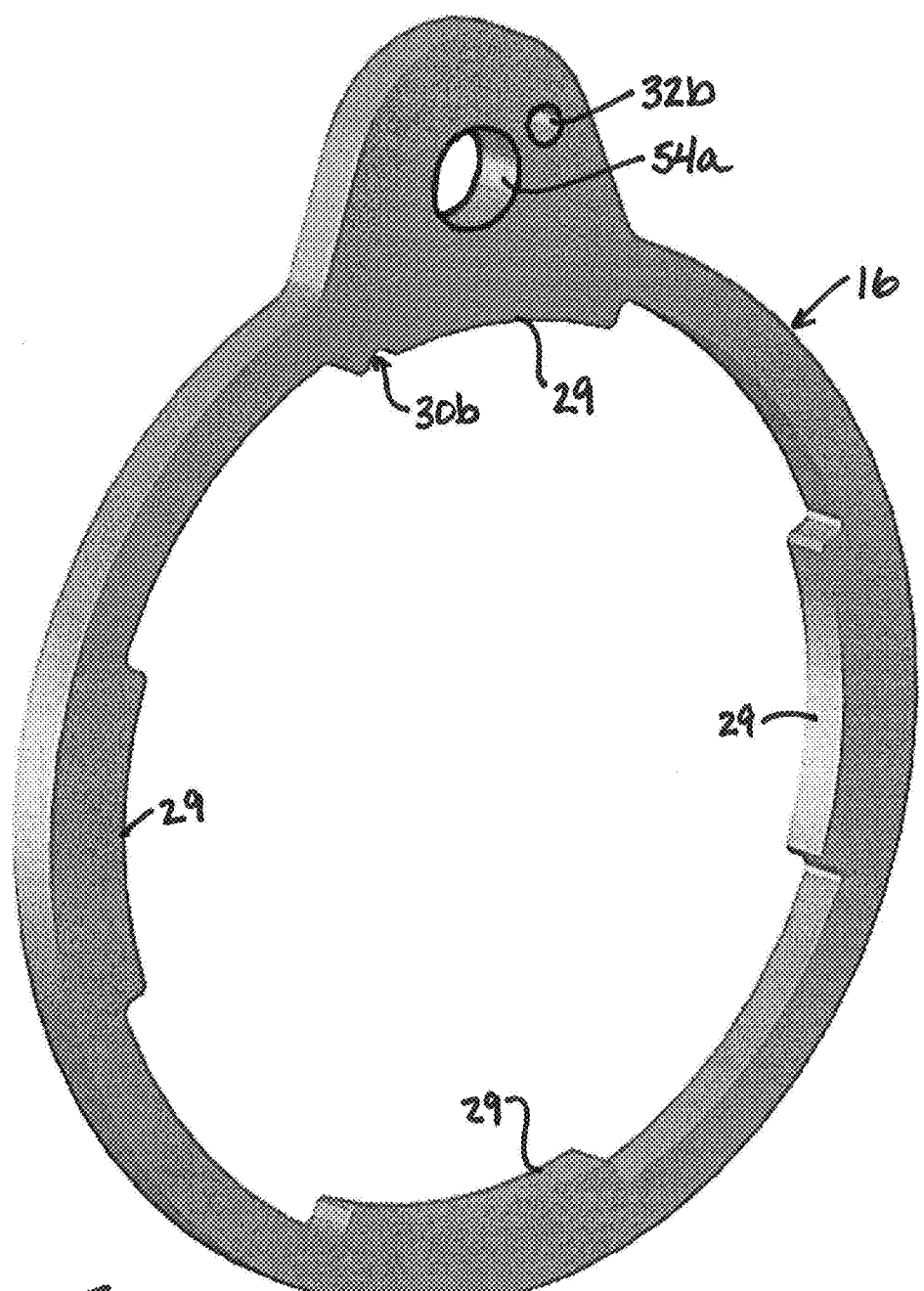
FIG. 26 shows a perspective of the retainer ring in isolation.
Figure 27:
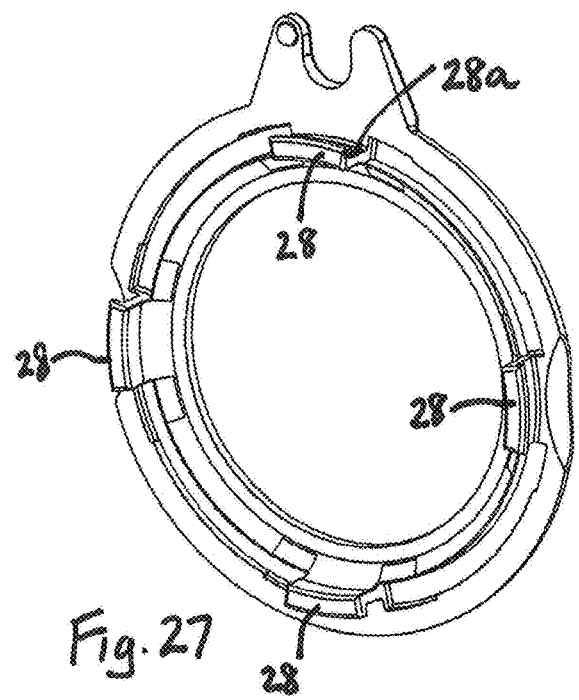
FIGS. 27-28 show perspectives of the rear cover in isolation.
Figure 28:
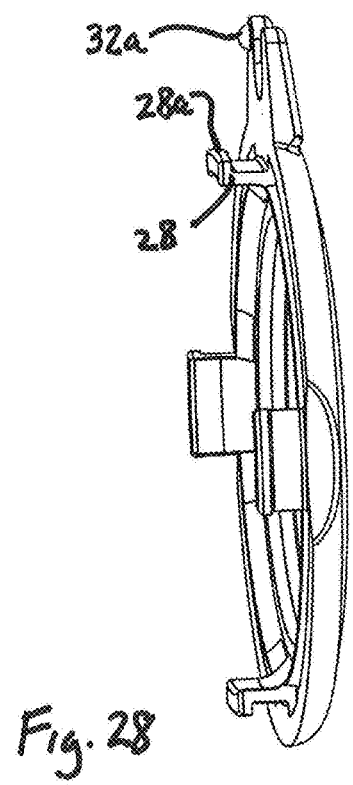
Figure 29:
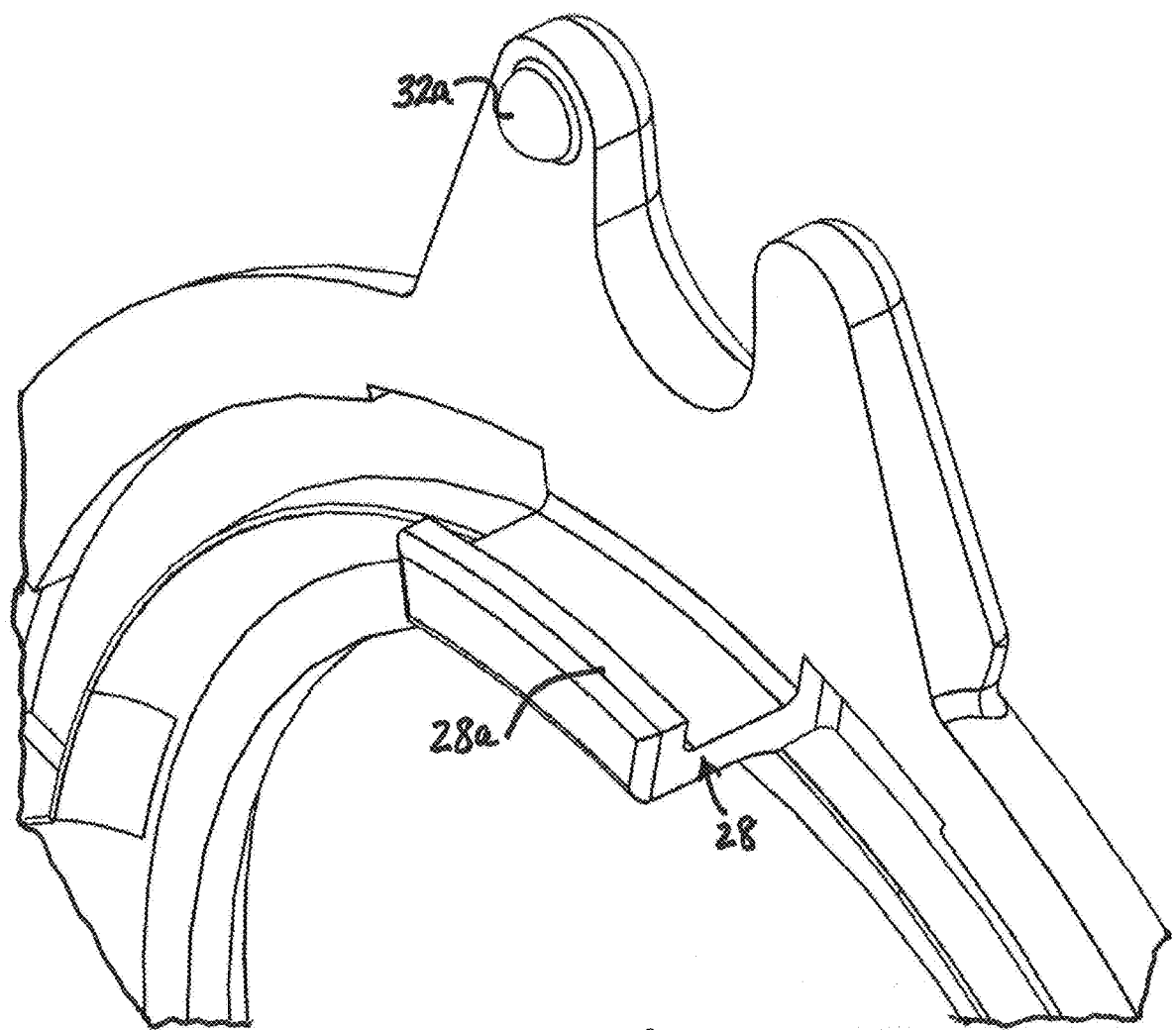
FIG. 29 shows a partial perspective of a forward facing portion of the rear cover.

Per the depiction in FIG. 3, the rear cover defines an access window 14a through which the electronic tracking component 20 can be accessed. Where the face of the component 20 includes a removable battery cover 20a, as here, the window allows the user to remove the battery cover 20a (e.g., by rotation) for batter replacement, without requiring the carrier to be disassembled.

It is to be clearly understood that the above description is intended by way of illustration and example only, is not intended to be taken by way of limitation, and that other changes and modifications are possible.

The invention claimed is:

1. A carrier assembly for a pet tag and an electronic tracking component, comprising:
 a front cover, a retainer ring and a rear cover engaged with each other, with the retainer ring between the front cover and the rear cover;
 wherein the front cover defines a first recess for receiving a pet tag and a second recess for receiving an electronic tracking component;
 wherein the retainer ring is rotatable, relative to the front cover and the rear cover, between a release position and a retention position, wherein, in the retention position of the retainer ring, the rear cover is retained adjacent the front cover and retainer ring for holding an electronic tracking device in the second recess, wherein, in the release position of the retainer ring, the rear cover is released to enable the rear cover to be separated from the front cover and retainer ring.

2. The carrier assembly of claim 1, wherein the front cover includes a plurality of pockets, wherein the rear cover includes a plurality of clips inserted in the pockets, wherein the retainer ring includes a plurality of retaining rim parts, wherein, in the retention position of the retainer ring, the retaining rim parts at least partially overlie retention portions of the clips to prevent the clips from being pulled out of the pockets, wherein, in the release position of the retainer ring, the retaining rim parts are offset from the retention portions of the clips to allow the clips to be pulled out of the pockets.

3. The carrier assembly of claim 1, further comprising:
 a first detent feature for releasably holding the retainer ring in the release position; and
 a second detent feature for releasably holding the retainer ring in the retention position.

4. The carrier assembly of claim 1, wherein the front cover includes a radially outward facing groove in which the retainer ring is seated to inhibit separation of the retainer ring from the front cover.

5. The carrier assembly of claim 4, wherein the front cover further includes tabs that align with portions of the retainer ring, when the retainer ring is in the retention position, for holding the retainer ring adjacent the front cover when the retainer ring is in the retention position.

6. The carrier assembly of claim 4, wherein the front cover includes first and second stops that limit rotation of the retainer ring relative to the front cover such that the retainer ring can only rotate a set rotational amount to move between the retention position and the release position.

7. The carrier assembly of claim 6, wherein the set rotational amount is less than ninety degrees.

8. The carrier assembly of claim 1, wherein the front cover includes a first forked projection defining a first slot, the rear cover includes a second forked projection aligned with the first forked projection, the second forked projection defining a second slot, and the retainer ring includes a projection with an opening for receiving a carrier ring, wherein, when the retainer ring is in the retention position, the opening aligns with the first slot and the second slot.

9. The carrier assembly of claim 1, further comprising a carrier ring engaged through the opening in the projection of the retainer ring that interacts with the first forked projection and the second forked projection to inhibit rotation of the retainer ring relative to the front cover and the rear cover.

10. The carrier assembly of claim 1, wherein the first recess defines an open window for viewing of a pet tag, wherein the second recess is a radially inward facing recess for receiving an edge portion of an electronic tracking device.

11. A carrier assembly carrying a pet tag and an electronic tracking component, comprising:
   a front cover, a retainer ring and a rear cover engaged with each other, with the retainer ring between the front cover and the rear cover;
   wherein the front cover defines a first recess and a second recess;
   the first recess holding a pet tag and providing a viewing window for a face of the pet tag;
   an an electronic tracking component engaged in the second recess;
   wherein the retainer ring is movable, relative to the front cover and the rear cover, between a release position and a retention position, wherein, in the retention position of the retainer ring, the rear cover is retained adjacent the front cover and retainer ring for holding the electronic tracking device in the second recess, wherein, in the release position of the retainer ring, the rear cover is released to enable the rear cover to be separated from the front cover and retainer ring for removal of the electronic tracking device.

12. The carrier assembly of claim 1, wherein the front cover includes a plurality of pockets, wherein the rear cover includes a plurality of clips inserted in the pockets, wherein the retainer ring includes a plurality of radially inwardly extending retaining rim parts, wherein, in the retention position of the retainer ring, the retaining rim parts at least partially overlie retention portions of the clips to prevent the clips from being pulled out of the pockets, wherein, in the release position of the retainer ring, the retaining rim parts are offset from the retention portions of the clips to allow the clips to be pulled out of the pockets.

13. The carrier assembly of claim 11, further comprising:
   a detent feature, between the retainer ring and the front cover, for releasably holding the retainer ring in the release position.

14. The carrier assembly of claim 11, further comprising
   a detent feature, between the retainer ring and the rear cover, for releasably holding the retainer ring in the retention position.

15. The carrier assembly of claim 11, wherein the front cover includes groove in which at least part of the retainer ring is seated to inhibit separation of the retainer ring from the front cover.

16. The carrier assembly of claim 15, wherein the front cover further includes tabs that align with portions of the retainer ring, when the retainer ring is in the retention position, for holding the retainer ring adjacent the front cover when the retainer ring is in the retention position.

17. The carrier assembly of claim 15, wherein the front cover includes first and second stops that limit rotation of the retainer ring relative to the front cover such that the retainer ring can only rotate a set rotational amount to move between the retention position and the release position.

18. The carrier assembly of claim 11,
   wherein the front cover, retainer ring and rear cover include a set of slots and/or openings, which are aligned when the retainer ring is in the retention position, and
   a carrier ring engaged through the set of slots and/or openings to inhibit rotation of the retainer ring relative to the front cover and the rear cover.

19. A carrier assembly for a pet tag and an electronic tracking component, comprising:
   a front cover, a retainer ring and a rear cover engaged with each other, with the retainer ring between the front cover and the rear cover;
   a first recess internal space for receiving a pet tag and a second internal space for receiving an electronic tracking component;
   wherein the retainer ring is movable, relative to the front cover and the rear cover, between a release position and a retention position, wherein, in the retention position of the retainer ring, the rear cover is retained adjacent the front cover and retainer ring for holding an electronic tracking device in the second internal space, wherein, in the release position of the retainer ring, the rear cover is released to enable the rear cover to be separated from the front cover and retainer ring.

* * * * *